(12) United States Patent
Choi et al.

(10) Patent No.: US 6,447,686 B1
(45) Date of Patent: Sep. 10, 2002

(54) RAPID COAGULATION-FLOCCULATION AND SEDIMENTATION TYPE WASTE WATER TREATMENT METHOD

(76) Inventors: Chun Sik Choi, 109-1101, Kumhotown, 923, Dongchun-dong, Younsu-gu, Inchon 406-130 (KR); Tae Il Yun, 901-1005, Mokdongsinsigagi Apt. 313 Sinjung-dong, Yangchun-gu, Seoul 158-070 (KR)

( * ) Notice: Subject to any disclaimer, the term of this patent is extended or adjusted under 35 U.S.C. 154(b) by 0 days.

(21) Appl. No.: 09/554,092
(22) PCT Filed: Apr. 2, 1999
(86) PCT No.: PCT/KR99/00162
§ 371 (c)(1), (2), (4) Date: May 25, 2000
(87) PCT Pub. No.: WO00/18690
PCT Pub. Date: Apr. 6, 2000

(30) Foreign Application Priority Data

Sep. 25, 1998 (KR) .............................. 98-39860

(51) Int. Cl.[7] .................................................. C02F 1/28
(52) U.S. Cl. ....................... 210/666; 210/710; 210/714; 210/713; 210/727; 210/738; 210/906; 210/199
(58) Field of Search ................................ 210/665–667, 210/702, 710, 714, 725, 727, 728, 738, 903, 906, 713, 199

(56) References Cited

U.S. PATENT DOCUMENTS

| | | | | |
|---|---|---|---|---|
| 3,350,302 A | * | 10/1967 | Demeter et al. ............. | 210/711 |
| 4,765,908 A | * | 8/1988 | Monick et al. ............. | 210/666 |
| 4,927,543 A | * | 5/1990 | Bablon et al. .............. | 210/711 |
| 4,997,573 A | * | 3/1991 | Browne ....................... | 210/714 |
| 5,681,475 A | * | 10/1997 | Lamensdorf et al. ....... | 210/666 |
| 5,830,388 A | * | 11/1998 | Kigel et al. ................. | 252/358 |
| 6,010,631 A | * | 1/2000 | Delsalle et al. ............. | 210/713 |
| 6,190,561 B1 | * | 2/2001 | Nagan ......................... | 210/665 |
| 6,210,588 B1 | * | 4/2001 | Vion ........................... | 210/711 |
| 6,261,459 B1 | * | 7/2001 | Waldmann ................... | 210/666 |

* cited by examiner

Primary Examiner—Peter A. Hruskoci
(74) Attorney, Agent, or Firm—Bacon & Thomas

(57) ABSTRACT

The present invention relates to a high speed coagulant-flocculant and sedimentation method for treating waste water, which permits a speedy treatment of waste water including stormwater runoff and also permits a valuable reuse of the sludge produced in the course of treatment. According to the present invention which achieves the object as described above, there is provided a method for treating waste water based on a high speed coagulation-flocculation and sedimentation which method is conducted in an arrangement for treating waste water based on a high speed aggregation and sedimentation, comprising a mixing tank, agitating tank, polymer aggregation tank and sedimentation tank in successive connection in that order, said arrangement being provided with transporting lines for transporting to the mixing or agitating tank the sludge produced in the sedimentation tank, and which method comprises introducing into the mixing tank the aggregating agent based on clay minerals, including zeolite or bentonite as the main component, introducing into the agitating tank an inorganic coagulant, and introducing into the polymer aggregation tank a polymeric flocculant on one hand, and introducing a combination of glass particle and kieselguhr into at least one of the mixing, agitating and polymer aggregating tank to convert the sludge resulted from treating the waste water into reusable porous ceramics on the other hand.

8 Claims, 1 Drawing Sheet

RAPID COAGULATION-FLOCCULATION AND SEDIMENTATION TYPE WASTE WATER TREATMENT METHOD

FIELD OF THE INVENTION

The present invention relates to a high speed coagulation-flocculation and sedimentation method for treating waste water and particularly to a novel high speed coagulation-flocculation and sedimentation method for treating waste water, which permits a speedy treatment of waste water including stormwater runoff and also permits a valuable reuse of the sludge produced in the course of treatment.

BACKGROUND OF THE INVENTION

Generally, the waste water is discharged after it was purified through a series of treatment steps in a waste water treatment station including a sewage treatment station, nightsoil treatment station and the like, wherein the waste water is first freed of the solid matter, floating matter, fatty matter and the like and then is subjected to a secondary or tertiary treatment as required by a desired water quality standard.

The water purified through such treatments should meet the required quality criteria, wherein the quantity of nitrogen and phosphorus which act as important factors for the eutrophication of the water is no less important than BOD, COD or the like. Because particularly the phosphorus of them is contained much higher in quantity in the influent water along with stormwater runoff from the ground surface than in the waste water itself, its effective removal calls for not only the treatment of the waste water resulting from point sources of contamination but also the treatment of stormwater runoff streams. However, the conventional waste water treatment processes mostly depended on a normal activated sludge process or extended aeration process, wherein the removal efficiency in term of total phosphorus amounted to so low as 10–30%. In addition, there was caused a problem, specially because the stormwater runoff streams at the time of rainfall were left to discharge without treatment.

On the other hand, as a most effective method of removing the phosphorus in the waste water, there is widely used the coagulation-flocculation and sedimentation method based on the use of coagulant. However, this method is associated with a problem in that an additional cost is required to treat the sludge which is inevitably produced as the result of the process and furthermore a secondary environmental pollution due to the sludge is caused.

SUMMARY OF THE INVENTION

The object of the present invention, which invention was created to resolve the above-described problems of the conventional art, is to provide a method for treating waste water based on a high speed coagulation-flocculation and sedimentation which permits a high speed treatment of waste water including stormwater runoff and an effective removal of phosphorus and also permits a valuable reuse of the sludge produced in the course of waste water treatment.

DETAILED DESCRIPTION OF THE INVENTION

Figure 1:
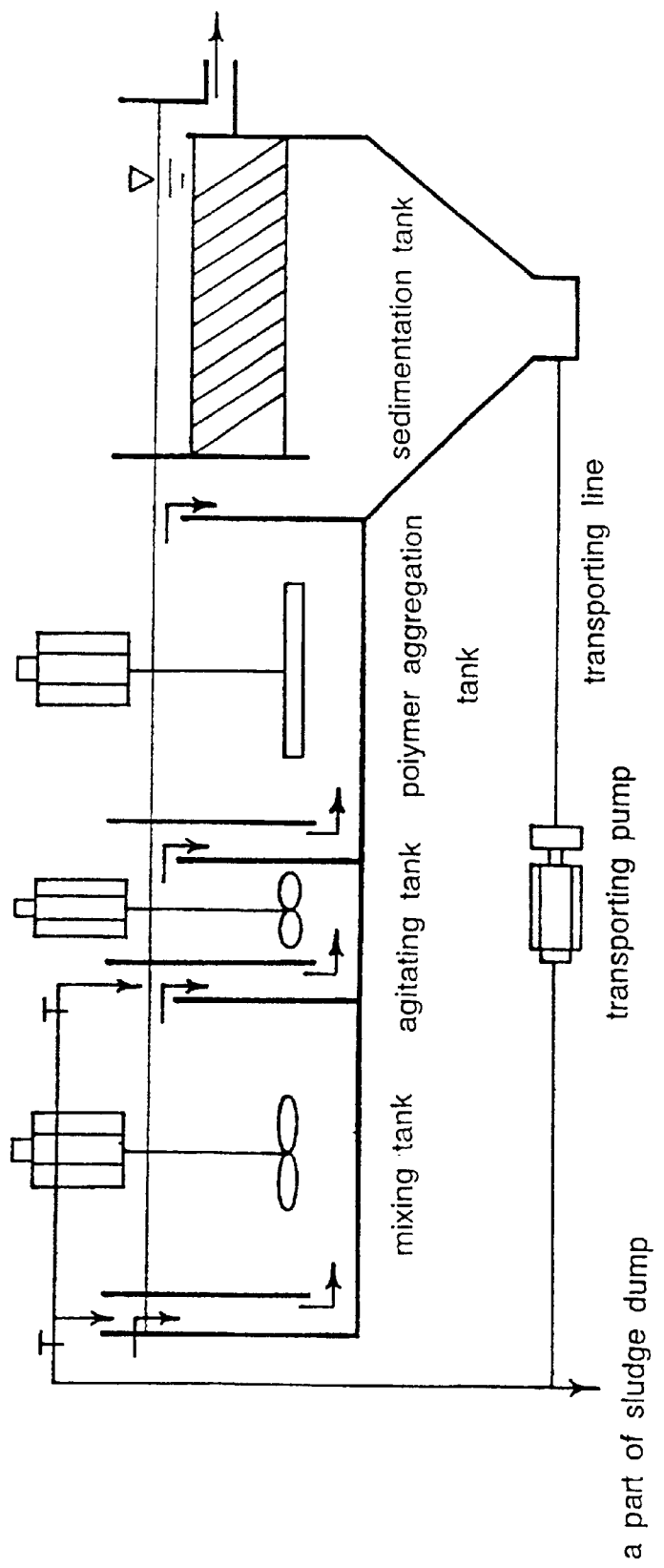
FIG. 1 shows a schematic view of an arrangement for treating waste water based on high speed coagulation-flocculation and sedimentation according to the present invention.

According to the present invention which achieves the object as described above, there is provided a method for treating waste water based on a high speed coagulation-flocculation and sedimentation which method is conducted in an arrangement for treating waste water based on a high speed coagulation-flocculation and sedimentation, comprising a mixing tank, agitating tank, polymer aggregation tank and sedimentation tank in a successive connection in that order, said arrangement being provided with transporting lines for transporting to the mixing- or agitating tank the sludge produced in the sedimentation tank, and which method comprises introducing into the mixing tank the coagulant based on clay minerals, including zeolite or bentonite as the main component, introducing into the agitating tank an inorganic aggregating agent, and introducing into the polymer aggregation tank a polymeric flocculant on one hand, and introducing a combination of glass particle and kieselguhr into at least one of the mixing-, agitating- and polymer aggregating tank to convert the sludge resulted from treating the waste water into reusable porous ceramics on the other hand.

According to another aspect of the present invention, there is provided a method for treating waste water based on a high speed coagulation and sedimentation which method is conducted in an arrangement for treating waste water based on a high speed coagulation and sedimentation, comprising a mixing tank, agitating tank, polymer aggregation tank and sedimentation tank in a successive connection in that order, said arrangement being provided with transporting lines for transporting to the mixing- or agitating tank the sludge produced in the sedimentation tank, and which method comprises introducing into the mixing tank the glass particles with a particle size of 20–200 $\mu$m, introducing into the agitating tank an inorganic coagulant, and introducing into the polymer aggregation tank a polymeric flocculant on one hand, and introducing a kieselguhr into at least one of the mixing-, agitating- and polymer aggregating tank to convert the sludge resulted from treating the waste water into reusable porous ceramics on the other hand.

According to still other aspect of the present invention, there is provided a method for treating waste water based on a high speed coagulation-flocculation and sedimentation which method is conducted in an arrangement for treating waste water based on a high-speed coagulation-flocculation and sedimentation, comprising a mixing tank, agitating tank, polymer aggregation tank and sedimentation tank in a successive connection in that order, said arrangement being provided with transporting lines for transporting to the mixing- or agitating tank the sludge produced in the sedimentation tank, and which method comprises introducing into the mixing tank the aggregating agent based on clay minerals, including zeolite or bentonite as the main component, introducing into the agitating tank an inorganic coagulant, and introducing into the polymer aggregation tank a polymeric flocculant and introducing a mixture of glass particles with a particle size of 20–200 $\mu$m and kieselguhr to convert the sludge resulted in the sedimentation tank into reusable porous ceramics.

According to further aspect of the present invention, there is provided a method for treating waste water based on a high-speed coagulation-flocculation and sedimentation which method is conducted in an arrangement for treating waste water based on a high speed coagulation-flocculation and sedimentation, comprising a mixing tank, agitating tank, polymer aggregation tank and sedimentation tank in a successive connection in that order, said arrangement being provided with transporting lines for transporting to the mixing- or agitating tank the sludge produced in the sedimentation tank, and which method comprises introducing into the mixing tank the glass particles with a particle size of 20–200 μm, introducing into the agitating tank an inorganic coagulant, and introducing into the polymer aggregation tank a polymeric flocculant, and introducing a kieselguhr to convert the sludge resulted in the sedimentation tank into reusable porous ceramics.

DETAILED DESCRIPTION OF THE INVENTION

Now, the present invention is described below in detail. FIG. 1 shows an arrangement for treating waste water based on rapid coagulation-flocculation and sedimentation according to the present invention.

The rapid coagulation-flocculation and sedimentation type waste water treating method according to the present invention is conducted in an arrangement which comprises a mixing tank, agitating tank, polymer aggregation tank and sedimentation tank in a successive connection in that order, and which is provided with transporting lines for transporting to the mixing- or agitating tank the sludge produced in the sedimentation tank, as depicted in FIG. 1. This arrangement for treating waste water may be applied to the treatment of sewage water in a sewage treatment station, the treatment of the muddy water resulting from constructing work or lake dredging, or the treatment of stream water flowing into a lake, river or sea.

In the mixing tank of such a waste water treating arrangement according to the invention, the aggregating agent based on clay mineral, having zeolite or bentonite as the main component, is introduced and subjected to mixing. As this aggregating agent, Aqua #219(supplied by Jeongkwang Aqua Co. Ltd. KR) is recommended. In the mixing tank, the aggregating agent is blended and dissolved effectively and is given enough retention time, for example 3 minutes, to have effective contact with the waste water to be treated. The organic matter, nitrogen and phosphorus compounds contained in the waste water are adsorbed in the aggregating or flocculating agent and suspended in the water. As the above-mentioned clay type aggregating agent containing mostly zeolite or bentonite is high in density, it contributes to the increase in the density of resulting aggregated matter and thus the acceleration of its settling velocity. In such a manner, the presence of the aggregating agent plays its role of forming aggregates, resulting in the effective removal of heavy metals and phosphorous components.

In the agitating tank, inorganic coaguant is introduced to make sure the coagulation of the suspended matter produced in the foregoing mixing tank so that precipitate including the heavy metals and phosphorus may be formed. As the inorganic aggregating agent for use in such an agitating tank, the conventional one can be used and preferably alum (aluminium sulfate) or the mixture of alum and ferric chloride at 7:3 may be used. Thus, in this agitating tank, the separated particles produced in the above-mentioned mixing tank are flocked together with the aid of inorganic coagulant and suspended or partially buoy up as flocculant matter. The reaction of producing the sediment of phosphor taking place in the agitating tank may be expressed as in the following schemes:

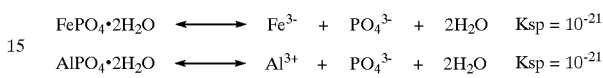

However, because $AlPO_4$ is unstable at about pH of 7, it is known that the phosphorus compound is precipitated in the form of $Al_yPO_4(OH)_{3y-3}$. In this case, the formation reaction for the phosphorous precipitate is known to take place as follows:

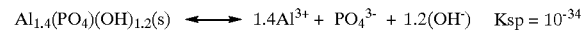

In addition, in case $FePO_4$ aggregates with ferric chloride as well, the resulting form is known generally as $Fe_yPO_4(OH)_{3y-3}$.

Next, the polymer aggregation tank acts to form the aggregates perfect and as large as over several hundred micrometers from fine aggregates to promote the settling velocity. To that end, polymeric flocculant is introduced there. As the polymeric flocculant, the polyacrylamide-based agent, which is one of anionic polyelectrolytes, for example, "SA 307" (manufactured by Songwon Ind. Co. Ltd.) or "YA 712" (manufactured by lyang Chem. Co. Ltd.) may be preferably used.

Finally, in the sedimentation tank, the precipitates formed in the preceding tanks are settled and removed, wherein a speedy settling at a throughput of over 300 m/day in conjunction with a high efflux rate of treated water may be expected by employing an inclined plate settling tank equipped with a scraper. Further, transfer lines for recycling some of the sludge in the sedimentation tank to the preceding tanks are provided, so that the particles included in the sludge may be repeatedly used to increase the useful particle density in the tanks while reducing the fresh use of the agent, whereby aggregating velocity is increased with the floating particles abundantly supplied and settling property of flocks are also improved.

On the other hand, according to the present invention, glass particles and kieselguhr are added in one of the mixing, agitating and polymer aggregating tanks. This is intended to reuse the sludge produced in the waste water treating arrangement as porous ceramics. Generally, the porous ceramics are used in a variety of applications such as artificial soil, various filters, culture media, carriers for microbes or the like, heat insulators, water preserving material, adsorbent, odor adsorbing material and the like.

The above-mentioned kieselguhr is used to impart to the porous ceramics an excellent void proportion which is made possible by the fact that the fine pores present in the particles of kieselguhr remain unchanged even after the sintering process. The glass particles act to join together the particles of sludge or kieselguhr three-dimensionally by softening or melting during the sintering process, wherein the glass can be softened for its intended purpose in a heat treatment at a temperature as low as 700–850° C., approximately the glass softening point, in comparison to the higher temperature ranging from 1000 to 1300° C. for sintering kieselguhr or zeolite in the production of porous ceramics. Therefore, the combined use of glass and kieselguhr according to the invention permits saving in energy for the manufacture of porous ceramics due to the low softening point of the glass compared with the case of no glass component and at the same time the maintenance of high porosity compared with the case of absence of glass particle and kieselguhr.

While the addition of glass and kieselguhr may be made either at the step of rapid mixing or rapid agitation, it is more preferable to add the mixture along with an inorganic coagulant agent into the agitating tank as the suspended matter produced in the prior mixing tank can thereby be aggregated more reinforcedly and effectively to gain the speeded settling velocity in this agitating tank. The average particle size of glass particle and kieselguhr lies preferably within the range of between 20 and 200 μm. When the size is below the lower limit of 20 μm, the settling velocity of the sediment is lowered, while above the upper limit of 200μm, the ultimate porous ceramic product from the sludge is deteriorated, as the moldability of porous ceramics becomes poor and the sintering reaction is negatively influenced by the presence of coarse particles. Regarding the mixing ratio of the glass particle, the amount of glass relative to the other components excluding the glass, i. e. the clay mineral-based aggregating agent containing kieselguhr, zeolite or bentonite as the principal component and the other additives such as alum, ferric chloride and polymer aggregating agent ranges, in weight, from 7:3 to 3:7. When the amount of glass particle is excessive relative to the other additives including the kieselguhr and the like, the resulting porous ceramics become poor in porosity. On the other hand, in the case of the excessive other additives, the disadvantage is caused because the heat treatment is required up to the sintering temperature for the kieselguhr or the like which is considerably higher than the softening point of glass.

On the other hand, the sludge is collected, dewatered and molded into a desired form e. g. a pellet form and then subjected to a sintering oven in which sintering process is conducted at a temperature of 700–850° C. near the softening point of glass to produce the desired porous ceramics. The porous ceramics so produced have an excellent physical property as will be described later.

Furthermore, according to an aspect of the invention, into the above-mentioned mixing tank there is introduced glass powder instead of the clay mineral based aggregating agent including zeolite or bentonite as the main component. This is based on the fact that the sole glass particle can compare with the mineral based aggregating agent in the capability of boosted aggregation to permit a high settling velocity corresponding to the throughput of over 300 m/day under effective removal of organic matter and phosphorus component. In this case, the kieselguhr may also be added in any one of the mixing, agitating and polymer aggregating tanks.

Moreover, it is also possible to admixed the glass particle and kieselguhr directly with the produced sludge rather than put them in the course of treating the waste water. In that case, the kieselguhr may be added either into the sedimentation tank where the produced sludge is deposited or at a third place to which the deposited sludge has been transferred from the sedimentation tank.

Optionally, the clay mineral based aggregating agent including zeolite or bentonite as the main component may be replaced by the glass particle in the intermediate steps of treating the water and the kieselguhr can be added to the sludge in the sedimentation tank. In that case too, the kieselguhr may be added either into the sedimentation tank where the produced sludge is deposited or at a third place to which the deposited sludge has been transferred from the sedimentation tank.

EXAMPLE 1

A test was conducted at a waste water treatment facility based on a high speed coagulation-flocculation and sedimentation according to the invention at an overflow rate of 300 m/day by using as the raw water the biologically treated water from at Sungki sewage treatment station located in Inchon, Korea. The recycling ratio of sludge from the sedimentation tank was kept at 5%, in the mixing tank Aqua #219 was added in varied quantity and subsequently mixed for a period of 3 minutes, and in the agitation tank the mixture of alum and ferric chloride at a blending ratio of 7:3 was added in varied quantity and agitated for a period of 1 minute. Thereafter, YA 712 was added in the polymer aggregation tank at an amount of 1 mg/l and caused to aggregate for a period of 3 minutes. The result of analysis for the water so treated is listed in the following table 1.

TABLE 1

|  |  | (1) | | (2) | | (3) | |
| --- | --- | --- | --- | --- | --- | --- | --- |
|  | Article | Raw water | Treated water | Raw water | Treated water | Raw water | Treated water |
| Additive | Aqua#219 (mg/L) |  | 30 |  | 50 |  | 70 |
|  | Alum (mg/L) |  | 35 |  | 35 |  | 49 |
|  | Ferric chloride (mg/L) |  | 15 |  | 15 |  | 21 |
|  | YA 712 (mg/L) |  | 1 |  | 1 |  | 1 |

TABLE 1-continued

| | | (1) | | (2) | | (3) | |
|---|---|---|---|---|---|---|---|
| | Article | Raw water | Treated water | Raw water | Treated water | Raw water | Treated water |
| Result of treatment | pH | | 6.7 | | 6.5 | | 6.3 |
| | BOD (mg/L) | 10.6 | 4.7 | 7.5 | 1.0 | 51.6 | 9.0 |
| | removal eff. (%) | | 55.7 | | 86.7 | | 82.6 |
| | COD (mg/L) | 29.2 | 6.5 | 23.4 | 3.5 | 74.6 | 13.3 |
| | removal eff. (%) | | 77.7 | | 85.0 | | 82.2 |
| | T-P (mg/L) | 2.99 | 0.25 | 2.16 | 0.20 | 4.37 | 0.41 |
| | removal eff. (%) | | 91.6 | | 90.7 | | 90.6 |
| | T-N (mg/L) | 24.5 | 20.5 | 20.3 | 16.5 | 13.9 | 11.2 |
| | removal eff. (%) | | 16.3 | | 18.7 | | 19.4 |
| | SS (mg/L) | 19 | 4.3 | 6 | 2.7 | 10.1 | 6.3 |
| | removal eff. (%) | | 77.4 | | 55.0 | | 37.4 |

Particularly, it is seen from the above table that regardless of the added amount of Aqua #219, alum and ferric chloride, the removal efficiency for total phosphorus amounted to over 90% and the removal efficiencies for BOD and COD were also satisfactory.

EXAMPLE 2

A test was conducted at a waste water treating facility based on a high speed coagulation-flocculation and sedimentation according to the invention by using as the raw water the biologically treated water from at Sungki sewage treatment station located in Inchon, Korea. In the mixing tank, Aqua #219, glass particle with an average particle size of 50 $\mu$m and kieselguhr with an average particle size of 40 $\mu$m were added in varied quantity and subsequently mixed for a period of 3 minutes, and in the agitation tank the mixture of alum and ferric chloride at a blending ratio of 7:3 was added in varied quantity and agitated for a period of 1 minute. Thereafter, YA 712, an anionic polymer aggregating agent (manufactured by lyang Chemical) was added in the polymer aggregation tank at an amount of 1 mg/l and caused to aggregate for a period of 3 minutes. The recycling ratio of sludge from the sedimentation tank to the mixing tank was kept at 5%, The result of analysis for the water so treated is listed in the following table 2.

From Table 2, it is appreciated that in this case of adding further components of glass particle and kieselguhr the removal rate of total phosphorus increased to over 95%.

EXAMPLE 3

Another test was conducted at a waste water treating facility as mentioned above by using as the raw water the biologically treated water from Sungki sewage treatment station located in Inchon, Korea. In the mixing tank, Aqua #219, glass particle with an average particle size of 50 $\mu$m and kieselguhr with an average particle size of 40 $\mu$m were added in varied quantity and subsequently mixed for a period of 3 minutes, and in the agitation tank the alum was added at a rate of 50 mg/l and agitated for a period of 1 minute. Then, YA 712 was added in the polymer aggregation tank at an amount of 1 mg/l and caused to aggregate for a period of 3 minutes. The recycling ratio of sludge from the sedimentation tank to the mixing tank was kept at 5%, The result of analysis for the water so treated is listed in the following table 3.

TABLE 2

| | | (1) | | (2) | | (3) | |
|---|---|---|---|---|---|---|---|
| | Article | Raw water | Treated water | Raw water | Treated water | Raw water | Treated water |
| Additive | Aqua#219 (mg/L) | | 18 | | 50 | | 100 |
| | Glass particle (mg/L) | | 24 | | 66.7 | | 133.3 |
| | kieselguhr (mg/L) | | 18 | | 50 | | 100 |
| | Alum (mg/L) | | 50 | | 35 | | 70 |
| | Ferric chloride (mg/L) | | 0 | | 15 | | 30 |
| | YA 712 (mg/L) | | 1 | | 1 | | 1 |
| Result of treatment | pH | 7.32 | 6.78 | 7.23 | 6.90 | 7.23 | 6.56 |
| | BOD (mg/L) | 26.7 | 10.3 | 16.2 | 5.1 | 16.2 | 1.2 |
| | removal eff. (%) | | 61.4 | | 68.5 | | 92.6 |
| | COD (mg/L) | 37.6 | 14.5 | 29.1 | 8.1 | 29.1 | 3.2 |
| | removal eff. (%) | | 61.4 | | 72.2 | | 89.0 |
| | T-P (mg/L) | 0.96 | 0.08 | 0.99 | 0.05 | 0.99 | 0.009 |
| | removal eff. (%) | | 91.7 | | 95.0 | | 99.1 |
| | T-N (mg/L) | 17.8 | 14.9 | 20.4 | 15.5 | 20.4 | 15.2 |
| | removal eff. (%) | | 16.3 | | 24.0 | | 25.5 |

TABLE 3

| | Article | Raw water | (1) | (2) | (3) | (4) |
|---|---|---|---|---|---|---|
| Additive | Aqua#219 (mg/L) | | 0 | 0 | 0 | 0 |
| | Glass particle (mg/L) | | 50 | 100 | 50 | 100 |
| | kieselguhr (mg/L) | | 0 | 0 | 50 | 50 |
| | Alum (mg/L) | | 50 | 50 | 50 | 50 |
| | YA 712 (mg/L) | | 1 | 1 | 1 | 1 |
| Result of treatment | pH | 7.32 | 6.89 | 6.97 | 6.69 | 6.21 |
| | BOD (mg/L) | 26.7 | 6.1 | 6.1 | 15.7 | 10.5 |
| | removal eff. (%) | | 77.2 | 77.2 | 41.2 | 60.7 |
| | COD (mg/L) | 37.6 | 19.5 | 14.5 | 22.7 | 21.1 |
| | removal eff. (%) | | 48.1 | 61.4 | 39.6 | 43.9 |
| | T-P (mg/L) | 0.96 | 0.16 | 0.09 | 0.09 | 0.09 |
| | removal eff. (%) | | 83.3 | 90.6 | 90.6 | 90.6 |
| | T-N (mg/L) | 17.8 | 15.5 | 14.9 | 14.8 | 14.6 |
| | removal eff. (%) | | 12.9 | 16.3 | 16.9 | 18.0 |

Table 3 indicates that the removal efficiency of total phosphorus can be as high as 83% or more just with glass and kieselguhr without any Aqua #210. A comparison of the run (1) and (2) for the case of only glass shows the higher removal efficiency for COD, total phosphorus and total nitrogen in the run (2) with higher quantity than in the run (1) with the lower quantity. On the other hand, the comparison of the run (3) and (4) for the case of using the glass particle together with the kieselguhr shows that the increase in the quantity of glass has no appreciable effect on the removal efficiency of the total phosphorus and total nitrogen but minor effect on the removal efficiency for BOD and COD. Comparing the run (1) for the case of using only glass particle without kieselguhr with the run (3) for the case of using the unvaried amount of glass particle and further the kieselguhr and the run (2) for the case of using only glass particle without kieselguhr with the run (4) for the case of using the unvaried amount of glass particle and further the kieselguhr, it is appreciated that the runs (1) and (2) for the case of no kieselguhr are more advantageous in the point of BOD and COD but the runs (3) and (4) for the case of using kieselguhr are more advantageous in the point of the removal efficiency for the total phosphorus and total nitrogen. The run (2) for the total quantity of added glass at 100 mg/l was approximately as effective as with regard to the total phosphorus and total nitrogen but more effective with regard to BOD and COD than the run (3) for the same total quantity of additive at 100 mgA but composed of the respective half of glass particle and kieselguhr.

EXAMPLE 4

A still other test was conducted at various flow rates of water at a waste water treating facility as mentioned above by using as the raw water the biologically treated water from Sungki sewage treatment station located in Inchon, Korea. The recycling ratio of sludge from the sedimentation tank to the mixing tank was kept at 5%. In the mixing tank, glass particle with an average particle size of 70 µm and kieselguhr with an average particle size of 50 µm were added each at 50 mg/l and mixed at a rapid speed for a period of 3 minutes, and in the agitation tank the alum was added at a rate of 50 mg/l and agitated for a period of 1 minute. Then, YA 712 was added in the polymer aggregation tank at an amount of 1 mg/l and caused to aggregate for a period of 3 minutes. The result of analysis for the water so treated is listed in the following table 4.

TABLE 4

| | | (1) | | (2) | | (3) | |
|---|---|---|---|---|---|---|---|
| | Article | Raw water | Treated water | Raw water | Treated water | Raw water | Treated water |
| Additive | overflow ratio (m/day) | | 300 | | 360 | | 420 |
| | Glass particle (mg/L) | | 50 | | 50 | | 50 |
| | kieselguhr (mg/L) | | 50 | | 50 | | 50 |
| | Alum (mg/L) | | 50 | | 50 | | 50 |
| | YA 712 (mg/L) | | 1 | | 1 | | 1 |
| Result of treatment | pH | | 6.7 | | 6.6 | | 6.5 |
| | BOD (mg/L) | 22.7 | 3.9 | 29.6 | 4.7 | 38.2 | 9.0 |
| | removal eff. (%) | | 82.8 | | 84.1 | | 76.4 |
| | COD (mg/L) | 17.5 | 10 | 16 | 10 | 30 | 16 |
| | removal eff. (%) | | 42.9 | | 37.5 | | 46.7 |
| | T-P (mg/L) | 0.97 | 0.10 | 0.74 | 0.11 | 1.06 | 0.07 |
| | removal eff. (%) | | 89.7 | | 85.1 | | 93.4 |
| | T-N (mg/L) | 13.6 | 11.3 | 20.5 | 16.9 | 30.7 | 27.7 |
| | removal eff. (%) | | 16.9 | | 17.6 | | 9.8 |
| | SS (mg/L) | 11.5 | 2.0 | 11 | 4.8 | 43 | 5.0 |
| | removal eff. (%) | | 82.6 | | 56.4 | | 88.4 |

It is seen from Table 4, that addition of only glass particle and kieselguhr without Aqua #219 in the mixing tank still leads to the attainment of the removal efficiency for the total phosphorus and total nitrogen at over 85%. An increase in the overflow rate appeared to be favorable to the treatment result.

EXAMPLE 5

Another test was conducted at a waste water treating facility as mentioned above by using the biologically treated water from Sungki sewage treatment station located in Inchon, Korea. At the overflow rate of 300 m/day(treating rate of 5 m³/hr) the sludge was returned from the sedimentation tank to the mixing tank at the recycling ratio of 5%. In the mixing tank, glass particle with an average particle size of 50 µm was added and mixed at a rapid speed for a period of 3 minutes, and in the agitation tank the alum was added and agitated rapidly for a period of 1 minute. Then, YA 712 was added in the polymer aggregation tank at an amount of 1 mg/l and caused to aggregate for a period of 3 minutes. The result of analysis for the water so treated is listed in the following table 4.

TABLE 5

|  |  | (1) | | (2) | | (3) | |
| --- | --- | --- | --- | --- | --- | --- | --- |
|  | Article | Raw water | Treated water | Raw water | Treated water | Raw water | Treated water |
| Additive | Glass particle (mg/L) |  | 30 |  | 50 |  | 70 |
|  | Alum (mg/L) |  | 50 |  | 50 |  | 50 |
|  | YA 712 (mg/L) |  | 1 |  | 1 |  | 1 |
| Result of treatment | pH |  | 6.8 |  | 6.5 |  | 6.2 |
|  | BOD (mg/L) | 20.7 | 10.2 | 38.2 | 4.8 | 27.5 | 4.3 |
|  | removal eff. (%) |  | 50.7 |  | 87.4 |  | 84.4 |
|  | COD (mg/L) | 29.3 | 14.5 | 42.5 | 20.5 | 24.5 | 7.5 |
|  | removal eff. (%) |  | 50.5 |  | 51.8 |  | 69.4 |
|  | T-P (mg/L) | 1.64 | 0.52 | 1.35 | 0.13 | 1.14 | 0.18 |
|  | removal eff. (%) |  | 68.3 |  | 90.4 |  | 84.2 |
|  | T-N (mg/L) | 17.0 | 12.3 | 15.5 | 10.7 | 10.0 | 5.8 |
|  | removal eff. (%) |  | 27.6 |  | 31.0 |  | 42.0 |
|  | SS (mg/L) | 11.5 | 7.0 | 6.8 | 2.48 | 27.4 | 6.4 |
|  | removal eff. (%) |  | 39.1 |  | 64.7 |  | 76.6 |

Table 5 indicates that even in the case only the glass particle was added and mixed, a high removal efficiency of over 84% could be attained with enough use of 50 mg/A or more.

As can be appreciated from the above-described examples, the high speed coagulation-flocculation and sedimentation which the present invention seeks can be achieved through various routes which includes adding the glass particle only, the combination of glass particle and kieselguhr, or the combination of Aqua #219, glass particle and kieselguhr. Moreover, the addition of glass particle and kieselguhr which was partially intended to reuse the sludge showed no appreciable detrimental action regarding the water treatment as a whole but instead had a favorable effect on the treating capability of waste water in comparison with the conventional art.

EXAMPLE 6

A test was conducted at a waste water treating facility as mentioned above by using as the raw water the biologically treated water from Sungki sewage treatment station located in Inchon, Korea. With the recycling ratio of sludge at 5%, in the mixing tank, Aqua #219, glass particle with an average particle size of 50 μm and kieselguhr with an average particle size of 40 μm were added in varied quantity and subsequently mixed together for a period of 3 minutes. In the agitation tank the alum and ferric chloride at a blending ratio of 7:3 were added at various adding rates and agitated for a period of 1 minute. Then, YA 712 was added in the polymer aggregation tank at an amount of 1 mg/A and caused to aggregate for a period of 3 minutes. After the resulting sludge was dried, it was granulated to the particle size of 1 mm and heat treated at around 800° C. to thereby provide porous ceramics. The physical properties for the porous ceramics so obtained were measured as in the following table 5.

TABLE 6

| Article | | (1) | (2) | (3) |
| --- | --- | --- | --- | --- |
| Additive | Aqua #219 (mg/L) | 18 | 50 | 100 |
|  | Glass particle (mg/L) | 24 | 133.4 | 166.6 |
|  | kieselguhr (mg/L) | 18 | 50 | 100 |
|  | Alum (mg/L) | 50 | 35 | 70 |
|  | Ferric chloride (mg/L) | 0 | 15 | 30 |
|  | YA 712 (mg/L) | 1 | 1 | 1 |
| Result of treatment | void proportion (%) |  | 45.3 | 46.0 |
|  | Density (g/cc) |  | 1.33 | 1.29 |
|  | Absorptivity (g/cc) |  | 0.43 | 0.44 |

For the case under the article (1) in Table 6, it was almost impossible to obtain porous ceramics under the condition tested at 800° C., because the glass particle used was so low as to amount to only less than 30% based on the other additives. It is seen that the porous ceramics manufactured under the articles (2) and (3), however, had excellent physical properties in comparison with the conventional porous ceramics having the void proportion of 35 to 40%.

EXAMPLE 7

The sludge pertaining to the runs (3) and (4) in the foregoing Example 3 was subjected to drying, formed into granules having an average particle size of 1 mm and then sintered at the temperature of 800° C. to provide porous ceramics. The physical properties for the porous ceramics so obtained were measured as in the following table 7.

TABLE 7

| Article | | (3) | (4) |
| --- | --- | --- | --- |
| Additive | Aqua #219 (mg/L) | 0 | 0 |
|  | Glass particle (mg/L) | 50 | 100 |
|  | kieselguhr (mg/L) | 50 | 50 |
|  | Alum (mg/L) | 50 | 50 |
|  | YA 712 (mg/L) | 1 | 1 |
| Result of | void proportion (%) | 48.1 | 45.7 |

TABLE 7-continued

| Article | | (3) | (4) |
|---|---|---|---|
| treatment | Density (g/cc) | 1.17 | 1.21 |
| | Absorptivity (g/cc) | 0.46 | 0.44 |

The table shows some physical properties of the porous ceramics manufactured from the sludge which resulted from treating the waste water by using glass particle instead of the clay type mineral in the mixing tank. It is clear that the decreased use of the kieselguhr relative to other components leads to the poor porosity of ceramic products.

As described already, the use of the glass particle and kieselguhr for reuse of the sludge did not reduce the treating ability of waste water but rather increased it to exceed the conventional method as may be confirmed from the test results for Example 1 through Example 5. The case wherein the glass particle instead of the clay type mineral including zeolite and bentonite was used exhibited specially excellent treatment results. It was also seen that the rapid coagulation-flocculation and sedimentation type waste water treatment method according to the present invention could limit the concentrations of the total phosphorus and the phosphate form phosphorus to satisfactory levels and particularly within 0.02 mg/l and 0.01 mg/A respectively. The quality of the porous ceramics manufactured from the disposable sludge which depended somewhat on the amount of the glass particle and kieselguhr used but was irrespective of the time of application of those mineral components was at least comparable with and in fact better than the conventional similar kinds.

The rapid coagulation-flocculation and sedimentation type waste watertreatment method according to the present invention thus permits the removal of harmful components in the waste water including heavy metals and phosphorus through a rapid coagulation-flocculation and sedimentation and also permits reuse of the produced sludge as porous ceramics.

In other words, the rapid coagulation-flocculation and sedimentation type waste water treatment method according to the present invention is so excellent in treating speed and treating efficiency compared to a conventional method as to treat the total quantity of the river water including stormwater runoff effectively and also contributes to the prevention of the secondary pollution by the sludge which is reused as valuable product.

Further, the porous ceramics which are produced at a low cost according to the present invention are remarkably excellent in the physical properties.

It is to be understood that, while the invention was described with respect to some specific examples, a variety of modifications and alterations would be possible to a man skilled in the art within the spirit of the invention and thus those modifications or alterations are to fall within the scope of the invention, which scope should be limited only by the attached claims.

What is claimed is:

1. A method for treating waste water based on high speed coagulation-flocculation and sedimentation which method is conducted in an arrangement for treating waste water based on a high speed aggregation and sedimentation, comprising a mixing tank, an agitating tank, a polymer aggregation tank and a sedimentation tank successively connected, said arrangement being provided with transporting lines for transporting to the mixing or agita produced in the sedimentation tank, comprising introducing into the mixing tank said waste water and an aggregating agent which is based on clay minerals including zeolite or bentonite as a main component, introducing into the agitating tank said waste water and an inorganic coagulant, introducing into the polymer aggregation tank said waste water and a polymeric flocculent and introducing a combination of glass particles and kieselguhr into at least one of the mixing, agitating and polymer aggregation tanks to convert the sludge resulting from treating the waste water into reusable porous ceramics.

2. A method of claim 1 wherein the average particle size of the glass particles and kieselguhr lies within the range of between 20 and 200 $\mu$m.

3. A method of claim 2 wherein the amount of glass relative to the other components excluding the glass ranges, in weight, from 7:3 to 3:7.

4. A method of claim 1 wherein the amount of glass relative to the other components excluding the glass, ranges in weight, from 7:3 to 3:7.

5. A method of claim 1 wherein the aggregating agent is a zeolite or bentonite.

6. A method for treating waste water based on high speed coagulation-flocculation and sedimentation process which method is conducted in an arrangement for treating waste water based on high speed aggregation and sedimentation, comprising a mixing tank, an agitating tank, a polymer aggregation tank and sedimentation tank successively connected, said arrangement being provided with lines for transporting to the mixing, or agitating tank sludge produced in the sedimentation tank, and which method comprising introducing into the mixing tank said waste water and glass particles with a particle size of 20–200 $\mu$m, introducing into the agitating tank said waste water and an inorganic coagulant, introducing into the polymer aggregation tank said waste water and a polymeric flocculent and introducing a kieselguhr into at least one of the mixing, agitating and polymeric aggregation tanks to convert the sludge resulting from treating the waste water into reusable porous ceramics.

7. A method for treating waste water based on high speed coagulation-flocculation and sedimentation which method is conducted in an arrangement for treating waste water based on high-speed aggregation and sedimentation, comprising a mixing tank, an agitating tank, a polymer aggregation tank and a sedimentation tank in a successive connection in that order, said arrangement being provided with transporting lines for transporting to the mixing or agitating tank the sludge produced in the sedimentation tank, and which method comprises introducing into the mixing tank said waste water and an aggregating agent based on clay minerals, including zeolite or bentonite as a main component, introducing into the agitating tank said waste water and an inorganic coagulant, introducing into the polymer aggregation tank said waste water and a polymeric flocculent, and introducing a mixture of glass particles with a particle size of 20–200 $\mu$m and kieselguhr to convert the sludge resulted in the sedimentation tank into reusable porous ceramics.

8. A method for treating waste water based on high speed coagulation-flocculation and sedimentation which method is conducted in an arrangement for treating waste water based on high speed aggregation and sedimentation, comprising a mixing tank, an agitating tank, polymer aggregation tank and sedimentation tank in a successive connection in that order, said arrangement being provided with transporting lines for transporting to the mixing or agitating tank the sludge produced in the sedimentation tank, and which method comprises introducing into the mixing tank said waste water and glass particles with a particle size of 20–200 $\mu$m, introducing into the agitating tank said waste water and an inorganic coagulant, and introducing into the polymer aggregation tank said waste water and a polymeric flocculant, and introducing a kieselguhr to convert the sludge resulted in the sedimentation tank into reusable porous ceramics.

* * * * *